United States Patent Office 2,816,039
Patented Dec. 10, 1957

2,816,039

PROCESS FOR MAKING POWDERED FRUIT JUICES

Roderick K. Eskew, Glenside, Pa., assignor to the United States of America as represented by the Secretary of Agriculture No Drawing. Application January 10, 1955,
Serial No. 481,041

3 Claims. (Cl. 99—206)

(Granted under Title 35, U. S. Code (1952), sec. 266)

A non-exclusive, irrevocable, royalty-free license in the invention herein described, for all governmental purposes throughout the world, with power to grant sublicenses for such purposes, is hereby granted to the Government of the United States of America.

This invention relates to processes for the dehydration of fruit juices.

Fresh fruit juices typically contain about 85–98% of water. This high water content places a heavy burden on the packaging, handling, storing and shipping of such juices and has stimulated the development of many processes for the partial or complete dehydration of such juices. Many difficulties have been encountered in such processes, especially those processes yielding dry, solid products, and heretofore there has been developed no practical process for the production of powdered juices that can be readily reconstituted by the addition of water to yield a product closely resembling fresh juice in flavor and appearance. The major difficulties encountered in prior processes, in addition to high cost are (1) loss of volatile flavoring constituents during the process of concentration; (2) development of undesirable off-flavors during the processing, usually because of heat damage; and (3) the product has often been a cohesive, gummy mass, tedious to dry, difficult to handle and package and very slow to dissolve in water when reconstituted.

An object of this invention is to provide economical processes for the substantially complete dehydration of fruit juices. Another object is to provide processes for producing powdered fruit juices wherein the product suffers negligible heat damage. Another object is to provide processes for the production of powdered fruit juices that may be quickly reconstituted by the addition of water to yield a product having substantially the flavor and appearance of fresh juice.

In the preferred procedure the fresh juice is stripped of volatile essence in a flash evaporator and the essence is further concentrated to perhaps 100- or 200-fold. The juice is depectinized, suitably by use of a commercial pectinase, after which it is concentrated to a sirup of about 70 to 85% solids content. This must be done without objectionable heat damage and is suitably effected in a vacuum flash evaporator. The concentrated essence may be returned to the concentrate at this point; also, it is frequently desirable to add sugar and/or fruit acid (citric, tartaric, malic, etc.) to improve the taste, assist in retention of volatile flavors and extend the product. The concentrate thus produced is the preferred starting material for the present invention. In general according to the invention, the fruit juice concentrate is preferably passed through a preheater into a vacuum down-flow film-type evaporator in a film of the order of 1 mm. thickness wherein the feed rate, temperature and vacuum are so regulated that the product emerges as a molten liquid at a temperature of about 240–250° F. and the heating time does not exceed about one minute and the vacuum is at least about 20 inches of mercury. The resulting product has a moisture content of about 2 to 4%. The film is then cooled to about ordinary room temperature to produce a hard, brittle solid that is readily ground to a powder.

The powdered product, when packaged in a moisture-proof container, particularly if an inpackage desiccant is used, may be stored at ordinary temperatures without caking. It readily dissolves in water to yield a product closely resembling fresh juice in flavor and appearance. If preferred the essence can be returned to the finished powder by first absorbing it in sorbitol, sugar or the like and then powdering.

An evaporator that has been found satisfactory for the final concentration step has a vertical tube, jacketed for heating fluid, down the inside of which flows the sirup being concentrated. Rotating blades within the tube keep the sirup in a thin film on the heated wall. An overhead outlet leads to a condenser and vacuum pump while a bottom outlet serves for removal of the product. The preheated concentrated juice is fed in above the heated zone at such a rate that the final product has the desired moisture content. The heating fluid is supplied at as high temperature as can be tolerated without excessive heat damage to the product. It has been found that steam at about 25 pounds per square inch (gauge) is suitable for most juices. The vacuum in the evaporator should be high enough to produce rapid evaporation without excessive temperatures, though very high vacuum reduces the capacity of the unit because of the increased vapor volume and requires larger condensers, colder cooling fluid and larger vacuum pumps. A practical compromise suitable for most juices is to use a vacuum of about 20 to 26 inches of mercury.

It is necessary, in selecting optimum values for the several process variables to first determine the moisture content desired in the final product. For most fruit juices it is necessary that this be less than about 4% in order that the product may be brittle enough to be pulverized at room temperature. Certain juices should be reduced to 2% moisture, others readily permit 3% or even 4%. If the product is chilled below room temperature before being ground, somewhat higher moisture content can be tolerated.

Having determined the final moisture content to be reached the three variables, feed rate, temperature and vacuum, governing the operation of the film-type evaporator are readily adjusted to the optimum operating condition where maximum throughput with minimum heat damage is obtained.

The falling film type vacuum evaporator with rotating blades is the only type that has been found to give a satisfactory product. Its great advantage lies in the very rapid concentration it effects, so that heat damage is minimized. The actual contact time in such an evaporator varies from a few seconds to, at most, a very few minutes, depending on the dimensions of the apparatus, feed rate and the viscosity of material being processed. A suitable evaporator is that described in U. S. Patent 2,596,086.

The following examples illustrate the practice of specific embodiments of the invention.

EXAMPLE I

*Grape juice powder:* The volatile essence was stripped from Concord grape juice and concentrated to 150-fold by conventional methods. The stripped juice was depectinized by use of commercial pectinase, after which the pectinase was inactivated by heating the juice to 210° F. for 2 seconds. The juice was then filtered and concentrated to 83% solids in a flash evaporator under 26-inch vacuum. To each 1000 g. of the concentrate was added 500 g. of 83% sucrose sirup, 15 cc. of 15% solution of tartaric acid and 53 cc. of 150-fold essence. This mixture was then pumped through a tubular preheater which raised its temperature to 195° F. into a down-flow, rotary blade vacuum evaporator [laboratory size Turba-Film Evaporator sold by Rodney Hunt Machine Co., 43 Vale Street, Orange, Massachusetts] operated with 25-pound steam in the heater jacket and 23-inch vacuum in the evaporator. At a feed rate of 45–50 pounds per hour the contact time was less than 1 minute and the product emerged as a molten sirup at 240–250° F. and with a moisture content of less than 3%. It was pumped into a tray and cooled to room temperature under an atmosphere of less than 15% relative humidity. The product was then a hard brittle solid which was ground in a hammer mill to pass a 10-mesh screen. The coarse powder thus obtained readily dissolved in water to make a reconstituted juice closely resembling fresh juice in appearance and taste. When packaged in moisture-proof packages containing a paper envelope containing calcium oxide, the powder could be stored for at least several months at temperatures up to 100° F. without caking and without significant deterioration.

EXAMPLE II

*Apple juice powder*: An apple juice concentrate of 83% solids content was prepared as described in Example I. To each 1000 g. thereof was added 1000 g. of an 83% sucrose sirup, 50 cc. of 50% citric acid (monohydrate) and 81 cc. of 150-fold apple essence. This mixture was then evaporated to 3% moisture content and ground to a coarse powder as described in Example I. The product could be reconstituted or packaged dry as described in Example I. When reconstituted either immediately or after several months storage, it yielded a juice closely resembling fresh apple juice.

It has been observed that about 10-mesh size is the optimum for the powdered product. Coarser lumps are slow to dissolve when the juice is reconstituted. Finer powder has a greater tendency to cake in storage and also tends to form large, sticky agglomerates during reconstitution unless the powder is added to the water slowly and with vigorous stirring. Of course, other types of grinders or crushers may be used to reduce the product to a powder; the only precaution required is that excessive heating be avoided, otherwise the powder will become sticky and cannot be screened or handled satisfactorily. In general a temperature above about 100° F. should be avoided during grinding.

While the examples above are limited to grape and apple juices, the process is applicable to any fruit juice. It is particularly valuable for processing the juice of grapes, apples, blackberries, raspberries and cherries.

The addition of sucrose or other sugar sirups, fruit acids or essences to the concentrates is entirely optional and does not affect the operability of the process, though in most cases they improve the flavor of the reconstituted juice.

I claim:

1. The process for making powdered fruit juice comprising evaporating a fruit juice concentrate of about 70 to 85% solids content to at least about 96% solids content by forming the concentrate into a film of the order of 1 mm. thickness, heating said film at a temperature about from 240 to 250° F. for a time not exceeding about one minute while maintaining on it a vacuum of at least about 20 inches of mercury, cooling said film to a temperature at which it is a brittle solid and grinding it to a powder.

2. The process of claim 1 wherein the fruit juice is apple juice.

3. The process of claim 1 wherein the fruit juice is grape juice.

References Cited in the file of this patent
UNITED STATES PATENTS 2,596,086    Muller _____ May 6, 1952

OTHER REFERENCES

"Food Technology," vol. 1, No. 1, 1947, pages 85 to 94.
"Food Technology," vol. 8, January issue, pages 27 and 28.